(12) United States Patent
Sonne (10) Patent No.: US 10,819,108 B2
(45) Date of Patent: Oct. 27, 2020

(54) OVERVOLTAGE CLAMP WITH PARALLEL CONTROLLED RESISTIVE PATH

(71) Applicant: Altus Intervention (Technologies) AS, Stavanger (NO)

(72) Inventor: Darrell S. Sonne, Katy, TX (US)

(73) Assignee: Altus Intervention (Technologies) AS, Stavanger (NO)

( * ) Notice: Subject to any disclaimer, the term of this patent is extended or adjusted under 35 U.S.C. 154(b) by 188 days.

(21) Appl. No.: 16/097,724

(22) PCT Filed: May 23, 2017

(86) PCT No.: PCT/NO2017/050125
§ 371 (c)(1),
(2) Date: Oct. 30, 2018

(87) PCT Pub. No.: WO2017/209620
PCT Pub. Date: Dec. 7, 2017

(65) Prior Publication Data
US 2019/0157861 A1     May 23, 2019

(30) Foreign Application Priority Data
May 31, 2016   (NO) .................................. 20160924

(51) Int. Cl.
*H02H 9/04*     (2006.01)
*E21B 17/00*    (2006.01)

(52) U.S. Cl.
CPC .......... *H02H 9/045* (2013.01); *E21B 17/003* (2013.01); *H02H 9/041* (2013.01)

(58) Field of Classification Search
CPC ....... E21B 17/003; H02H 9/041; H02H 9/045
USPC .......................................................... 361/86
See application file for complete search history.

(56) References Cited

U.S. PATENT DOCUMENTS

| | | | |
|---|---|---|---|
| 3,573,550 | A | 4/1971 | Baker, Jr. |
| 4,186,418 | A | 1/1980 | Seiler |
| 2009/0147423 | A1 | 6/2009 | Mulligan et al. |
| 2012/0300350 | A1 | 11/2012 | Nguyen et al. |
| 2013/0100710 | A1 | 4/2013 | Kang et al. |
| 2016/0141867 | A1 | 5/2016 | Boecker et al. |
| 2016/0276826 | A1* | 9/2016 | Heurtier ................ H02H 9/041 |

FOREIGN PATENT DOCUMENTS

| | | |
|---|---|---|
| DE | 3213347 | 10/1983 |
| DE | 3340140 | 5/1985 |
| EP | 2792841 | 10/2014 |
| JP | H1074896 | 3/1998 |

* cited by examiner

*Primary Examiner* — Kevin J Comber
(74) *Attorney, Agent, or Firm* — Gable Gotwals (57) ABSTRACT

The invention relates to an overvoltage protection circuit, particularly in system where the load is remote from a regulated power supply and relates to an electric power supply system comprising such overvoltage protection circuit. The invention further relates to a downhole tractor comprising such overvoltage protection circuit, and to a tethered subsea vehicle comprising the overvoltage protection circuit.

8 Claims, 4 Drawing Sheets

OVERVOLTAGE CLAMP WITH PARALLEL CONTROLLED RESISTIVE PATH

CROSS-REFERENCE TO RELATED APPLICATIONS

This United States application is the National Phase of PCT Application No. PCT/NO2017/050125 filed 23 May 2017, which claims priority to Norwegian Patent Application No. 20160924 filed 31 May 2016, each of which is incorporated herein by reference.

FIELD OF THE INVENTION

The invention relates to an overvoltage protection circuit, particularly in systems where the load is remote from a regulated power supply. The invention also relates to an electric power supply system comprising such overvoltage protection circuit. The invention further relates to a downhole tractor comprising such overvoltage protection circuit, and to a tethered subsea vehicle comprising such overvoltage protection circuit. The invention also relates to a method of protecting an electronic circuit against overvoltage.

BACKGROUND OF THE INVENTION

Figure 1:
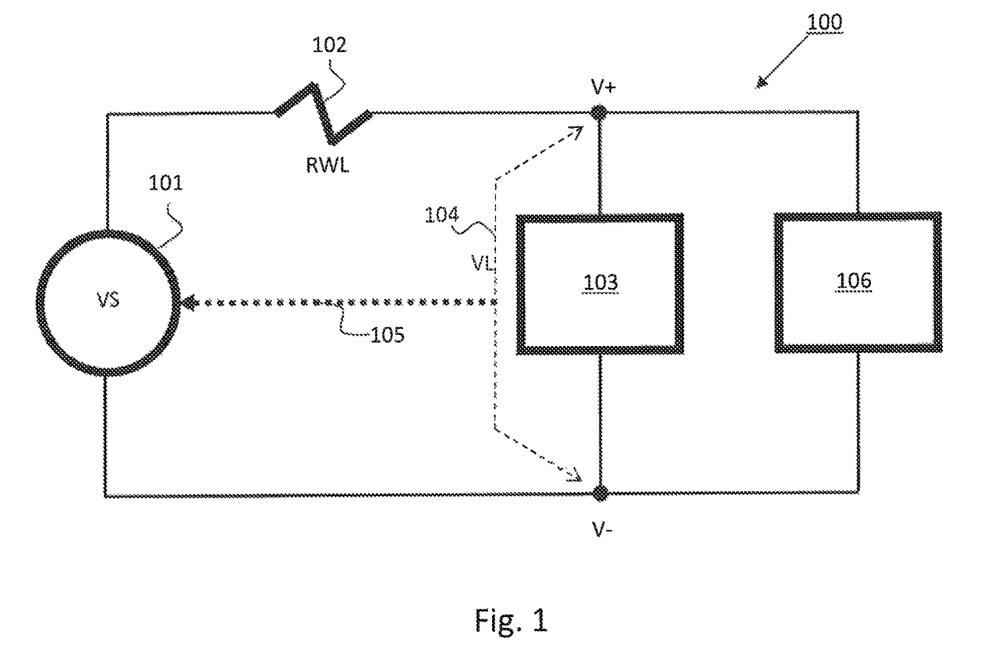
FIG. 1 shows a block diagram of an electrical power supply system, where the present invention may be utilized.

This invention applies to electrical systems that have a power source separated from the load by a resistance and a means of controlling the power source to regulate the voltage at the load. FIG. 1 shows a diagram of such a system 100. A DC voltage source 101 supplies power to electrical load 103 through a wireline 102. For simplicity, all the wireline resistance is shown grouped into a single resistor 102. In reality, the resistance is distributed over the length of the wireline. In addition, the wire may have other impedances like inductance and capacitance. The voltage across the load 103 is measured by a load voltage measurement circuit 104. The measurement is fed back to voltage source 101 through a telemetry channel 105. The voltage feedback is used to regulate the voltage across load 103.

The voltage regulation is formed by a feedback loop with components 101, 102, 104, and 105. This feedback loop has a finite response time. If the power consumption in load 103 were to change suddenly, or faster than the response time of the voltage regulation loop, the load voltage VL on the terminals V+, V− will momentarily change. In the case where the load suddenly changes from a heavy load to a near zero load, for instance when a heavy load is disconnected, the load voltage VL will momentarily rise to the level of voltage source 101. In many cases, this is detrimental to the electronic circuits at the load and will cause them to fail.

For example, suppose a load is operating at 400V and is consuming 8 A. Suppose this load is designed to safely handle 900V. Consider a circuit with a wireline resistance of 100Ω. In this case, the voltage drop across the wireline will be 800V. In order to provide the 400V to the load, the voltage source will be delivering 1200V to the wireline. If the load were to suddenly change to consume 0A, no voltage would be lost on the wireline. All 1200V would appear at the load. This is a destructive overvoltage condition for the circuitry connected parallel to the load.

In order to solve this problem an overvoltage clamp circuit 106 is introduced to clamp potential overvoltage transients like the condition just described.

The traditional approach toward building an overvoltage clamp circuit 106 is to use a voltage-clamping device such as a varistor or a Zener diode. These devices suffer from drawbacks. Varistors suffer from degradation when exposed to surges. This makes them unsuitable in applications where multiple surges can be expected between maintenance intervals.

Zener diodes suffer from limited energy dissipation and an exponential increase in failure rates with an increase in junction temperature. This makes them a poor choice in applications where elevated ambient temperatures and/or large surge energies need to be dissipated. This is clearly the case in a wireline tractor application.

Shunt regulating circuits suffer from the same drawback as the simpler Zener diode. These circuits use a transistor in the linear region to vary the load. When in the linear region, transistors dissipate energy. This energy causes a rise in their junction temperatures, which leads to failures.

Passive components like capacitors are also unsuitable for the task. The large capacitance and voltage rating that would be required to store the surge energy make these components unsuitable for the job.

Likewise, the crowbar circuit will not help in this application. When the crowbar circuit engages, it collapses the voltage at the load. This would result in the power supply increasing its output voltage instead of decreasing the voltage as is needed to correct the problem.

Another method of absorbing the excess surge energy is temporarily connecting a resistor to absorb the excess current. However, if the resistance is too large, it will not prevent the voltage from exceeding the maximum safe level. If the resistor is too small, it will cause a second overvoltage surge when it is disconnected from the circuit.

The problems described above clearly illustrate the need for more advanced voltage clamping solutions, particularly in systems where the load is remote from a regulated power supply, such as in downhole tractor applications and tethered subsea vehicles.

SUMMARY OF THE INVENTION

The invention has for its object to remedy or to reduce at least one of the drawbacks of the prior art, or at least provide a useful alternative to prior art.

The object is achieved through features, which are specified in the description below and in the claims that follow.

The invention is defined by the independent patent claims. The dependent claims define advantageous embodiments of the invention.

In a first aspect, the invention relates to an overvoltage protection circuit comprising:
  a first terminal and a second terminal for receiving a supply voltage at a load, and
  a voltage clamping circuit connected between said terminals and providing a clamping current path between said terminals as soon as the supply voltage over said terminals reaches a preset clamping voltage such that said supply voltage is substantially limited to said clamping voltage. The overvoltage protection circuit further comprises a controllable resistance circuit connected between said terminals parallel to the voltage clamping circuit, wherein the controllable resistance circuit is configured for providing a resistive current path parallel to the clamping current path of the voltage clamping circuit when the voltage clamping circuit is activated such that it conducts an electrical current, and for providing a high-impedance parallel to the clamping current path of the voltage clamping circuit when voltage clamping circuit is deactivated.

The effects of the overvoltage protection circuit in accordance with the invention may be understood as follows. The voltage clamping circuit is used to clamp the voltage to the preset clamping voltage, for instance defined by a series of Zener diodes connected in reverse-bias between said terminals forming a clamping current path. It was already described earlier that the Zener diodes suffer from poor energy dissipation capacity and thereby reliability in certain applications. The invention conveniently provides for determining when the voltage clamping circuit is activated, for instance by detecting when it starts to conduct an electric current, and subsequently providing a resistive current path parallel to the electric current path of the voltage clamping circuit. As soon as that happens the resistance in the resistive current path takes over the role of dissipating power from the voltage clamping circuit, thereby strongly reducing the current running therethrough and increasing the reliability of the voltage clamping circuit. Expressed in other words, the invention provides for a solution that exploits the benefits of two different solutions namely that of rectifying semiconductor elements and resistors. Furthermore, the current through the voltage clamping circuit is detected and triggers the controllable resistance circuit to provide the resistive current path parallel to the clamping current path. This provides a convenient implementation of the conditional provision of the resistive current path parallel to the voltage clamping circuit. In practice, this embodiment means the detected current value needs to be above a certain threshold before it triggers the controllable resistance circuit.

Additionally, the controllable resistance circuit is configured for changing an effective resistance of the resistive current path over time after triggering of the controllable resistance circuit. Typical transients on a supply voltage lead to typical peak current levels that quickly decay to lower less harmless levels. This embodiment conveniently adapts the role of the controllable resistance circuit to the actual need by changing the resistance as the current level reduces. The changing of the effective resistance of the resistive current path may be done gradually or in a stepwise fashion. It may be in a linear fashion, in an exponential fashion or any other transient.

The controllable resistance circuit is configured for selectively activating at least one parallel resistive path by means of at least one switching element for setting the effective resistance of the resistive current path by connecting at least a subset of the at least one resistive path in parallel with the clamping current path. This conveniently provides for controllability of the resistance of the resistive current path. In case of a plurality of resistive current paths the respective resistances of these paths may be the same or different (considered wheh selected).

In an embodiment of the overvoltage protection circuit in accordance with the invention the selective activation of the at least one parallel resistive path is controlled by a state-machine comprising a digital control circuit for digitally controlling the controllable resistance circuit. A state-machine constitutes a convenient solution for providing a plurality of outputs, which can be used to control the selection of the at least one resistive path. The state-machine may be integrated in a separate control circuit or as part of the controllable resistance circuit.

A few words and expressions need to be further explained for full and correct understanding of the meaning and scope of the invention.

The resistive current path need not be purely resistive, i.e. it may also have capacitive or inductive impedance elements.

The expression "provide a resistive current path parallel to the clamping current path" means either "connect an additional current path parallel to the clamping current path" or "reduce the resistance of an existing high-impedance current path that is already connected parallel to the clamping current path" or a combination of these two.

Where it is written "when the voltage clamping circuit is activated" this means that the supply voltage over said terminals is at the clamping voltage and consequently a current starts to flow through the voltage clamping circuit.

When it is written "when the voltage clamping circuit is deactivated" this means that the supply voltage over said terminals is dropped below the clamping voltage and no significant current flows through the voltage clamping circuit.

In an embodiment of the overvoltage protection circuit in accordance with the invention the state-machine is self-timed. In order to make such state-machine a clock generator may be implemented in the state machine, which may be synchronised with a trigger signal coming from the current detector in the voltage clamping circuit. Alternatively, such clock could be dispensed with, and handshake communication could be used.

In an embodiment of the overvoltage protection circuit in accordance with the invention the voltage clamping circuit comprises at least one clamping element connected between said terminals. In an advantageous embodiment, a Zener diode is used as clamping element. The advantage of a Zener diode is that there exist types having very high clamping voltages in the order of a few hundred Volts. This is particularly advantageous in the downhole tractor applications.

In an embodiment of the overvoltage protection circuit in accordance with the invention the voltage clamping circuit comprises at least two clamping elements connected in series between said terminals, wherein an intermediate node between said clamping elements is used for generating a further supply voltage, which is lower than the supply voltage on said terminals and which is used for supplying other circuitry in said overvoltage protection circuit. In an advantageous embodiment a plurality of Zener diodes connected in reverse bias are used as clamping elements.

Figure 5:
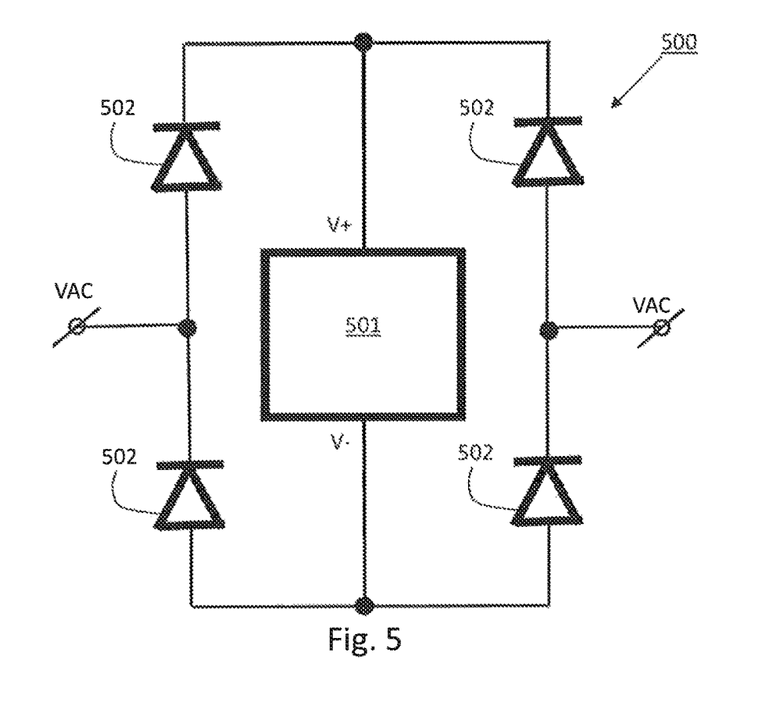
FIG. 5 shows an alternative embodiment of the overvoltage protection circuit in accordance with the invention for use in AC circuits.

In a second aspect, the invention relates to an AC overvoltage protection circuit (500) comprising:
  a voltage rectifier (502), such as a diode bridge, having input terminals for carrying an AC voltage and output terminals for supplying a rectified voltage, and
  the overvoltage protection circuit in accordance with any of claims 1 to 8, wherein the overvoltage protection circuit is coupled to the output terminals of the voltage rectifier circuit. This embodiment effectively turns the overvoltage protection circuit into an AC overvoltage protection circuit, which may be used in an AC source or a multiple-phase AC source.

In a third aspect, the invention relates to an electric power supply system comprising a voltage source, an electric cable having a resistive impedance, a load coupled to the voltage source via the electric cable, and an overvoltage protection circuit in accordance with the first aspect of the invention, wherein the overvoltage protection circuit is connected in parallel with the load. The overvoltage protection circuit is particularly advantageous in electric power supply systems that have a regulated voltage source that is remote from the load and connected therewith via a long cable having a significant resistance. In such systems there is a need for fast clamping combined with a large power dissipation capacity in cases of a peak current.

In an embodiment of the electric power supply system, the electric cable forms part of a wireline cable and the load forms part of a downhole tool connected to the wireline cable. This embodiment effectively constitutes a wireline conveyed downhole tool system comprising the voltage source (part of the wireline control device) at the surface, the wireline cable, and the downhole tool. The downhole tool may be any tool comprising built-in electronics, such as: (wireline) tractors, wireline strokers (stand-alone or conveyed by a tractor), suction tools with an electrical motor (stand-alone or conveyed by a tractor), Direct Drive Rotation (DDR) tools (typically conveyed by a tractor), and driller tools (typically stand-alone). Expressed different, the invention applies to all wireline conveyed tools that utilize an electro motor and/or electronics.

In a fourth aspect, the invention relates to a downhole tool comprising an overvoltage protection circuit in accordance with the first part of the invention. This embodiment constitutes a first important application field of the invention. In a first variant the downhole tool is a (wireline) tractor. In such embodiment the overvoltage protection circuit is connected in parallel with a tractor motor and/or tractor motor controller of the downhole tractor. The overvoltage protection circuit serves to protect other circuitry in the tractor, which is also connected parallel to the tractor motor/tractor motor controller and to the overvoltage protection circuit.

In a fifth aspect, the invention relates to a tethered subsea vehicle comprising an overvoltage protection circuit in accordance with the first aspect of the invention. This embodiment constitutes a second important main application field of the invention.

BRIEF INTRODUCTION OF THE DRAWINGS

In the following is described examples of preferred embodiments illustrated in the accompanying drawings, wherein.

DETAILED DESCRIPTION OF THE EMBODIMENTS

Figure 2:
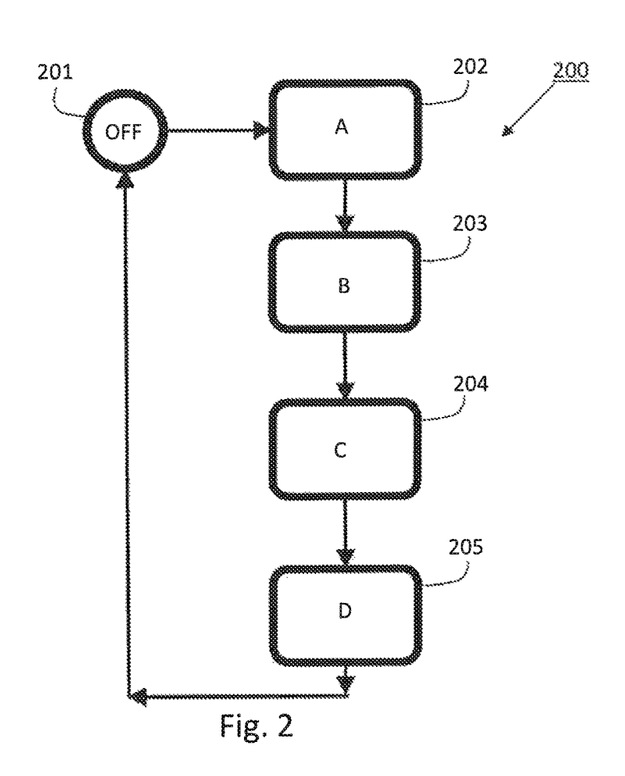
FIG. 2 shows a flowchart of the operation of an embodiment of the overvoltage protection circuit as shown in FIG. 3.

The essence of the present invention is an overvoltage protection circuit that prevents the voltages applied to it from exceeding a predetermined level. FIG. 1 shows a block diagram of an electrical power supply system 100, where the present invention may be utilized, as earlier discussed. FIG. 2 shows a flowchart 200 of the operation of an embodiment of the overvoltage protection circuit as shown in FIG. 3.

Figure 3:
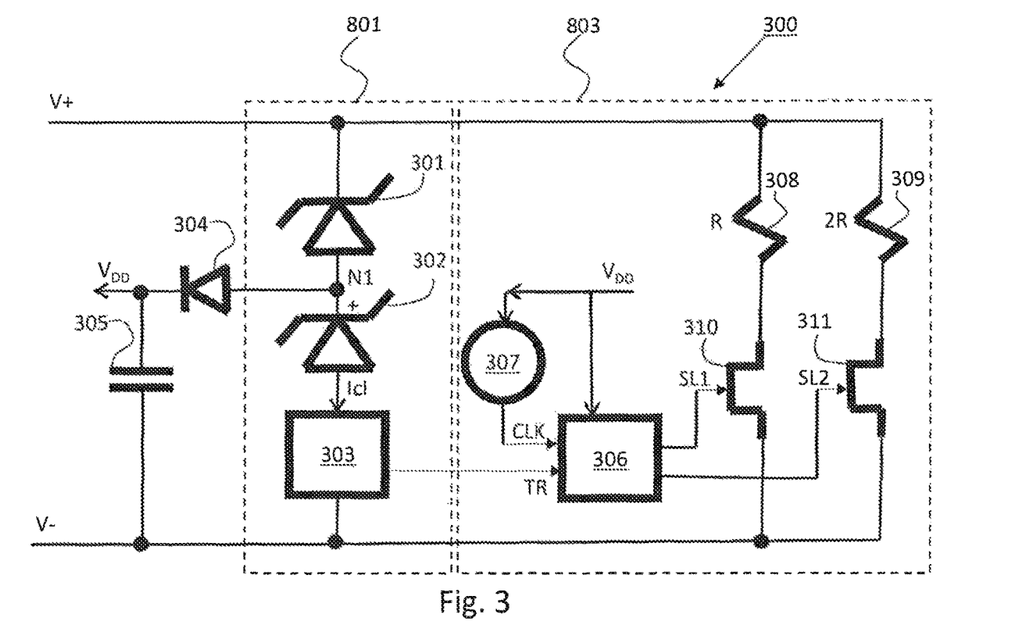
FIG. 3 shows a block diagram of the embodiment of an overvoltage protection circuit in accordance with the invention.

FIG. 3 shows a block diagram of an embodiment of the overvoltage protection circuit 300 in accordance with the invention.

With reference to FIG. 3, the overvoltage protection circuit 300 comprises two terminals connected to said terminals V+, V− for clamping the voltage over said terminals. The circuit 300 comprises a series connection of a first Zener diode 301, a second Zener diode 302 and a current sensor/detector 303 between said terminals V+, V−. An intermediate node N1 in between said Zener diodes is connected to a capacitor 305 via a diode 304 as illustrated. The voltage VDD over said capacitor 305 is used as a (reduced) supply voltage (in the respective ON states of the overvoltage protection circuit 300) for a digital logic circuit 306 and an oscillator 307 as illustrated. The current sensor (detector) 303 generates a trigger TR signal as soon as an electrical current Icl is detected running through the second Zener diode 302. This trigger signal TR is fed into the digital logic circuit 306, which on its turn has outputs having selection signals SL1, SL2 that are fed to respective selection transistors 310, 311. The digital logic circuit 306 forms an important ingredient of the state-machine in this embodiment. In this embodiment the digital logic is synchronized by a clock CLK generated by the oscillator 307. Each selection transistor 310, 311 is connected in series with a respective resistor 308, 309 as illustrated. In this embodiment the value of the second resistor 309 is twice the value 2R of the value R of the first resistor 308.

Figure 4:
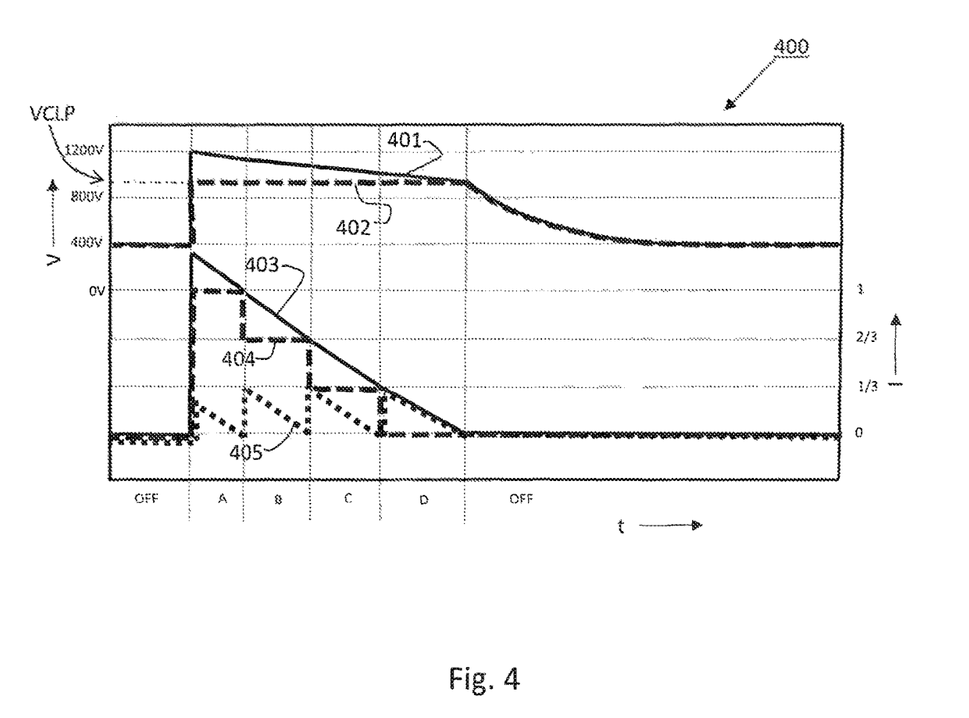
FIG. 4 shows a graph with typical waveforms of currents and voltages in the overvoltage protection circuit of FIG. 3.

FIG. 4 shows a graph with typical waveforms of currents and voltages in the overvoltage protection circuit of FIG. 3. FIG. 4 is provided as an aid in understanding the timing and voltage/current relationships in an embodiment of the overvoltage protection circuit 300 of the invention. The first waveform 401 shows a typical overvoltage pulse as it would appear in the absence of an overvoltage protection circuit 300 in accordance with the invention. The second waveform 402 shows the voltage across the terminals V+, V− of overvoltage clamp 300. The third waveform 403 shows the total current running through the overvoltage protection circuit 300. The magnitude of this current is given by: (VS−VL)/RWL.

With reference to FIG. 1 to FIG. 4, the operation begins in an unpowered off-state 201, OFF. In this state 201, OFF the voltage applied to the overvoltage clamp is less than the voltage limit VCLP set for the clamping circuit 300. Current flow between said terminals V+ and V− is blocked by the Zener diodes 301, 302. The voltage VDD is low (at or near the V− level), and said transistors 310, 311 are off. Said resistors 308, 309 are not drawing any current. The entire circuit functions as a high impedance since there is no path for the current to flow.

When an overvoltage event occurs, the circuit 300 switches from the off-state 201, OFF to the first on-state 202, A. This happens because the voltage applied across terminals V+ and V− exceeds the sum of the clamping voltages of said Zener diodes 301, 302. The excess voltage causes the Zener diodes 301, 302 to conduct current. The current flow through the Zener diodes 301, 302 prevents the voltage from rising substantially above the clamping voltage sum VCLP. The current flow through the Zener diodes also causes a voltage to be developed across the second Zener diode 302. This voltage will be transferred through said diode 304 to said capacitor 305. Voltage VDD is used as a (reduced) supply voltage to power the rest of the circuit as needed. The components receiving said reduced supply voltage VDD include the digital logic 306 and the oscillator 307. It is the presence of voltage VDD, which causes the state-machine to make transition to the first on-state 202, A.

The digital logic circuit 306 is designed to power up in the first on-state 202, A. The logic circuit 306 is designed such that both transistors 310, 311 are turned on in this stage 202, A. These transistors 310, 311 allow current to flow through both resistors 308, 309. This current substantially reduces the current Icl flowing in said Zener diodes 301, 302. In this state 202, A, the resistors 310, 311 absorb the maximum amount of the surge energy, thereby greatly increasing the reliability of the Zener diodes 301, 302.

The waveforms plotted in graph 400 show the relationships. The difference between the total current 403 and the resistor current 404 is the Zener diode current 405.

The digital logic circuit 306 remains in the first on-state 202, A, while the current sensor 303 indicates the presence of current Icl. This current Icl will decrease towards zero as the magnitude of the overvoltage event decreases. The digital logic circuit 306 senses the output of current sensor 303 at time intervals set by the oscillator 307. Within one clock period of the oscillator 307 after that the current Icl measured by current sensor 303 drops below a pre-determined level, the digital logic circuit 306 will make a transition to the second on-state 203, B. The capacitor 305 ensures that its voltage VDD remains steady during this transition.

In the second on-state B, the second output transistor 311 is off and the first output transistor 310 is on. This configuration causes a different amount of current to be consumed by the resistors than in the first on-state 202, A. In this embodiment the resistance of resistor 309 is twice the resistance of resistor 308. Therefore, the transistor configuration of the second on-state 203, B with only the first resistor 308 consuming current, causes the resistors to draw ⅔ of the current drawn in the first on-state 202, A. The difference in current between the first on-state A and the second on-state B has to go through the Zener diodes 301, 302. This is shown in the second rising edge of the fifth waveform 405 in FIG. 4.

The digital logic circuit 306 remains in the second on-state B while the current sensor 303 indicates the presence of current Icl. This current Icl will decrease towards zero as the magnitude of the overvoltage event decreases. The digital logic circuit 306 senses the output of the current sensor 303 at time intervals set by the oscillator 307. Within one clock period of the oscillator 307 after the current measured by the current sensor 303 drops below a pre-determined level, the digital logic circuit 306 will make a transition to the third on-state 204, C. The capacitor 305 ensures that its voltage VDD remains steady during this transition.

In the third on-state C, the first output transistor 310 is off and the second output transistor 311 is on. This configuration causes a different amount of current to be consumed by the resistors than in the second on-state B. The transistor configuration of the third on-state C, with only the second resistor 309 consuming current, causes the resistors to draw ⅓ of the current drawn in the first on-state A. The difference in current between the second on-state B and the third on-state C has to go through the Zener diodes 301, 302. This is shown in the third rising edge of the fifth waveform 405 in FIG. 4.

The digital logic circuit 306 remains in the third on-state C while the current sensor 303 indicates the presence of current Icl. This current Icl will decrease towards zero as the magnitude of the overvoltage event decreases. The digital logic circuit 306 senses the output of current sensor 303 at time intervals set by the oscillator 307. Within one clock period of the oscillator 307 after the current measured by the current sensor 303 drops below a pre-determined level, the digital logic circuit 306 will make a transition to the fourth on-state 205, D. The capacitor 305 ensures that its voltage VDD remains steady during this transition.

In the fourth on-state D, both output transistors 310, 311 are off and no current is consumed by the resistors 310, 311. The difference in current between the third on-state C and the fourth on-state D has to go through the Zener diodes 301, 302. This is shown in the fourth rising edge of the fifth waveform 405 in FIG. 4.

The digital logic circuit 306 remains in the fourth on-state D regardless of the output of the current sensor 303. The Zener diode current 405 will decrease towards zero and eventually reach zero. At this time, the voltage that appeared across the second Zener diode 302 will fall to zero. This voltage will no longer be transferred through diode 304 to capacitor 305. The capacitor voltage VDD will decay and the rest of the circuit will make a transition to the un-powered off-state OFF.

It must be stressed that, even if in the example of FIG. 3 the controllable resistance circuit 803 comprises two selectable resistors 310, 311, this could be done with any number of selectable resistors, even 1. Alternatively, it could be done with controllable resistors, i.e. resistors wherein the resistance value can be changed. The resistors may be purely resistive components, but it may also comprise inductance and/or capacitance.

FIG. 5 shows an alternative embodiment of the overvoltage protection circuit (AC clamp) 500 in accordance with the invention for use in an AC source or a multiple-phase AC source. This embodiment comprises a DC overvoltage protection circuit 501 which is very similar to the one discussed before. In order to render the circuit 500 to clamp AC voltages VAC it is provided within a diode bridge formed by four diodes 502 as illustrated. Diode bridges for rectifying AC voltages VAC are well-known to the person skilled in the art. The first modification in this embodiment of the overvoltage protection 501 is that its capacitor 305 is sized to function as a smoothing capacitor. Second, the current sensor 303 is smoothened to provide a stable output during the phase reversals of the oncoming AC waveform. It will be apparent to those skilled in the art that other methods may be employed to extend the overvoltage clamp for use in AC applications. The AC variant of overvoltage clamp 500 can be used in poly-phase circuits. For example, with three phase circuits, three AC clamps 500 are used. The clamps are connected between the phases or between each phase and ground.

Figure 6:
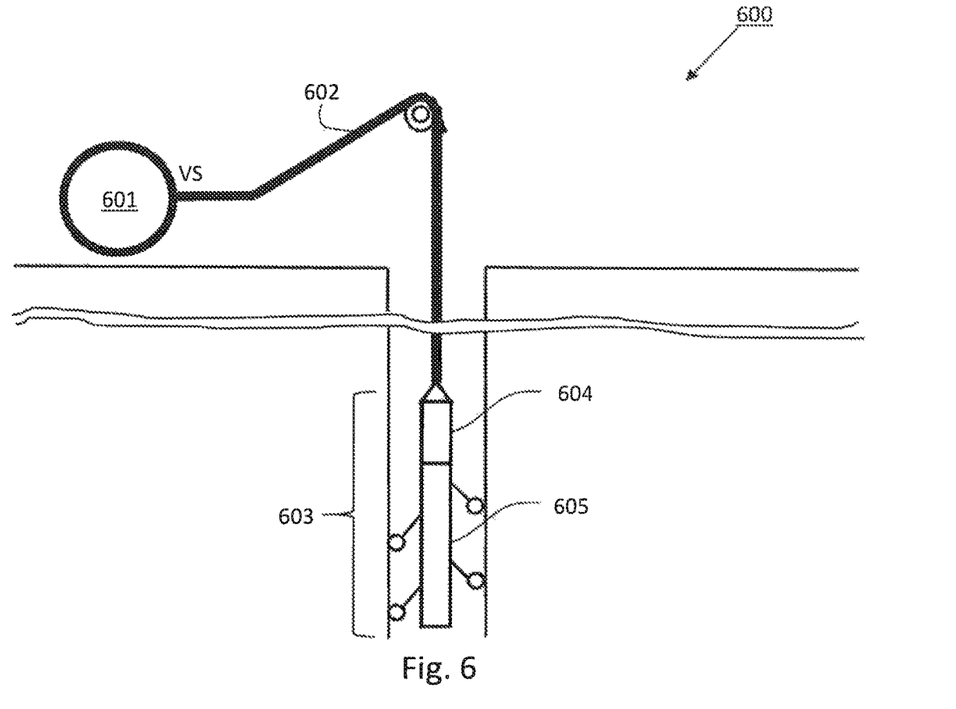
FIG. 6 shows a downhole tractor system when suspended on a wireline.

FIG. 6 shows a downhole tractor system 600 when suspended on a wireline. The figure is very schematic and for illustrative purposes only. It is shown a surface power supply 601 for providing a supply voltage VS at the surface. The supply voltage VS is fed into a wireline cable 602, which runs via a reel system into the well down to a wireline tractor 603 as illustrated. The wireline tractor 603 comprises an overvoltage protection unit 604 and a tractor drive section 605 as illustrated, but it may comprise many other units to perform downhole operations. The wireline cable 602 forms a very long (mainly) resistive path, i.e. quite a lot of voltage is lost over this cable. Consequently the downhole tractor system 600 needs to compensate for this voltage loss by increasing the supply voltage VS, as earlier discussed. In order to do this, a regulated system is preferred which obtains information about the voltage provided downhole and feeds this information back to the surface power supply

601. It is common to use a telemetry system for this. Due to changes in the electric load (for instance on and off-switching of the motors in the tractor drive section 605) voltage spikes or surges may occur, which may be harmful to certain electronic parts of the wireline tractor 603. This is the reason for implementing the overvoltage protection unit 604.

Figure 7:
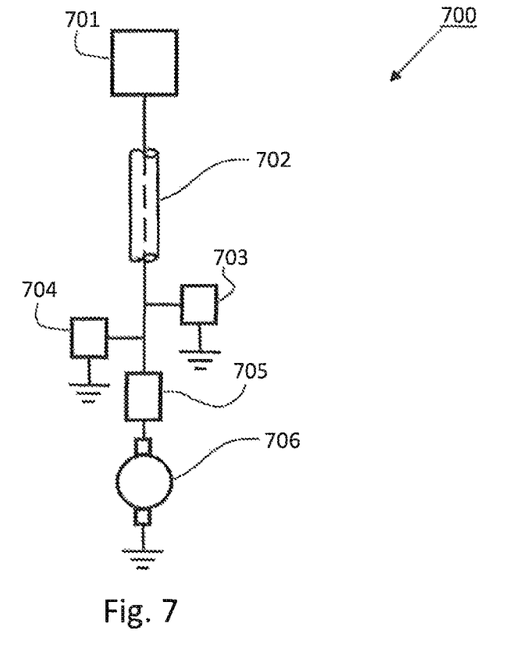
FIG. 7 shows an electric schematic of the downhole tractor system of FIG. 6.

FIG. 7 shows an electric schematic 700 of the downhole tractor system of FIG. 6. This schematic is a bit more elaborate than FIG. 6. It again shows a surface power supply 701 connected to a (resistive) wireline cable 702. The figure also shows that downhole the wireline cable 702 is coupled to a parallel connection of an overvoltage protection circuit 703, other downhole electronic circuits 704 (such a telemetry circuit, CCL, etc.), and a series connection of a motor controller 705 and a tractor motor 706. This complies with FIG. 1. The motor controller 705 converts the local DC voltage to an AC voltage for the motor. Furthermore, the motor controller 705 is configured to shut down if it senses that the motor stalls, gets overheated or has an overcurrent condition.

Figure 8:
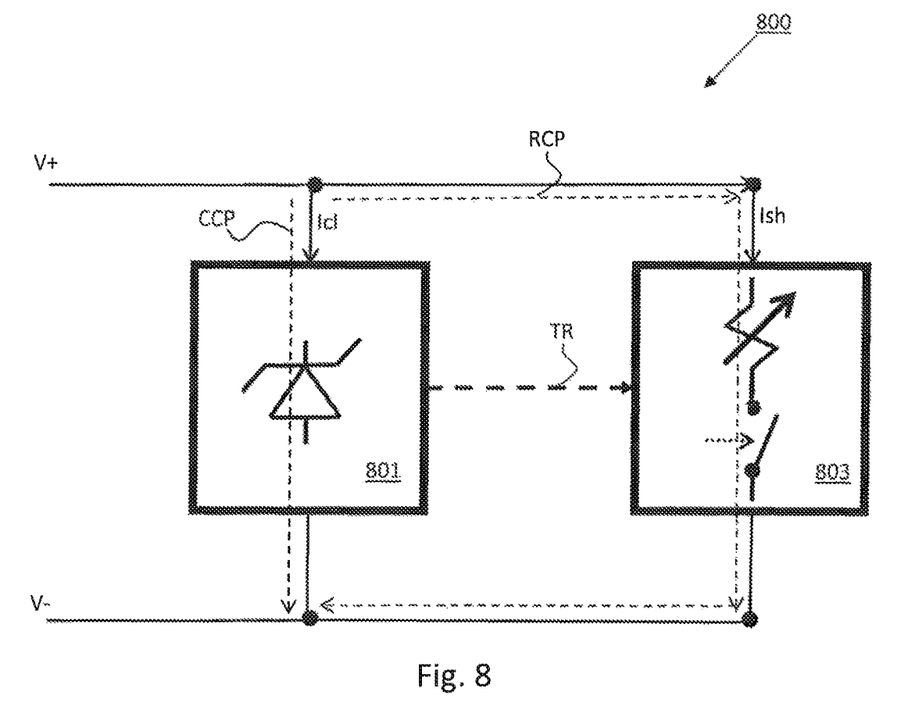
FIG. 8 illustrates the core of the invention.

FIG. 8 illustrates the core of the invention. This figure shows the most generalized embodiment of the overvoltage protection 800 in accordance with the invention. Reference is also made to FIG. 3 from which FIG. 8 has been derived. The core of the invention resides in the provision of a controllable resistance circuit 803 connected in parallel to an overvoltage clamping circuit 801 as illustrated. The voltage clamping circuit 801 comprises rectifying elements like (Zener) diodes for clamping the voltage to a specific value. There exists a large variety of voltage clamping circuits 801. Even though Zener diodes are very advantageous in the discussed applications, the invention is not limited to such clamping circuits at all. The invention may be similarly applied to any other type of voltage clamping circuit. What is important though, is that the voltage clamping circuit 801 generates some sort of trigger signal TR, which triggers the controllable resistance circuit 803. The trigger signal TR is to be derived from the current Icl running through a clamping current path CCP of the voltage clamping circuit, which then is an indication that the voltage clamping circuit 801 is active. As soon as the voltage clamping circuit 801 is active, i.e. as soon as it starts to clamp the voltage on said terminals V+, V−, the controllable resistance circuit 803 is to provide a resistive current path RCP parallel to the clamping current path CCP of the voltage clamping circuit 801. The controllable resistance circuit 803 may comprise one or more resistors (but other resistive elements are also possible) and one or more switching or selection elements (for instance transistors) to connect said resistors in parallel with the clamping current path CCP to form said resistive current path.

With reference to the figures, it is mentioned that the discussion of component choice and component dimensioning (sizing) is skipped. Such skills fall within the normal skills and routine of the person skilled in the art of designing electric circuits. Moreover, the requirements for the overvoltage protection circuit may vary from application to application. Moreover, the amount of variations that are possible in the design of the circuitry is extremely large, which is another reason not to focus too much on specific solutions.

As already mentioned earlier many modifications are possible without materially departing from the gist of this invention. All such modifications fall within the scope of this invention as claimed. In the discussion hereinafter a selection of these variations is discussed.

With reference to FIG. 1, it is submitted that the voltage source 101 may be regulated by a variety of methods without departing from the scope of this invention. Feedback 105 towards the voltage source 101 may come from an independent path, such as a sense wire. Alternatively, feedback may come from a telemetry channel or even an operator monitoring the system. Alternatively, the voltage feedback system may be replaced by an implied measurement taken near the voltage source 101. This can be accomplished by first measuring the current going into wireline 102 and multiplying this current by the wireline resistance 102 to compute the voltage drop across wireline 102. The voltage drop computation is then subtracted from the voltage at voltage source 101 to provide the implied measurement.

The present invention can by applied in any system that utilizes a regulated power supply separated from the load by a substantial resistance. The downhole wireline field is an example application where the present invention is especially well suited and has been discussed with reference to FIGS. 6 and 7. The tethered subsea environment is another application for the overvoltage clamp. Those skilled in the art will easily find more systems where remote electrical loads can benefit from a highly reliable overvoltage clamp.

With reference to FIG. 3, it is submitted that the circuit elements set forth in the overvoltage protection circuit 300 may admit to other equally effective embodiments. The function of Zener diodes 301, 302 may be realized by any circuit performing shunt voltage regulation. Some examples are composite circuits consisting of a plurality of Zener diodes, varistor and varistor circuits, shunt regulator circuits, and combinations thereof. Furthermore, the current measured by current sensor 303 can be located anywhere along the path and still achieve its function. Furthermore, the entire current sensor may be replaced by a circuit that measures voltage drop at circuit element 302. Also, the diode 304 in FIG. 3 is not required and is only shown as an aid in understanding the circuit. In addition, the capacitor 305 illustrates a type of energy storage. This function is not needed in many embodiments of the invention. The oscillator 307 merely represents a delay element, or predetermined time interval. Another embodiment suitable for AC applications is to utilize the periodic nature of the AC waveform to detect time intervals. The digital logic circuit 306 may be implemented with asynchronous techniques. In this case, the oscillator 307 is not needed. Also, the digital logic circuit 306 may control one or several resistors. No specific number of switched resistors is to be inferred from the teachings of this disclosure. What is important in the example given is that the effective resistance of the resistive current path can be changed. Furthermore, in FIG. 3, the relative resistance of the resistors 308, 309 may be different from the R/2R ratio presented. Other ratios of resistances are also possible, or the resistances may be chosen to be the same.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The mere fact that certain measures are recited in mutually different dependent claims does not indicate that a combination of these measures cannot be used to advantage.

In the device claim enumerating several means, several of these means may be embodied by one and the same item of hardware.

The invention claimed is:

1. Overvoltage protection circuit comprising:
   a first terminal (V+) and a second terminal (V−) for receiving a supply voltage (VL) at a load;
   a voltage clamping circuit connected between said terminals (V+, V−) and providing a clamping current path (CCP) between said terminals (V+, V−) as soon as supply voltage (VL) over said terminals (V+, V−) reaches a preset clamping voltage (VCLP) such that said supply voltage (VL) is substantially limited to said clamping voltage (VCLP), wherein the overvoltage protection circuit further comprises a controllable resistance circuit connected between said terminals (V+, V−) parallel to the voltage clamping circuit, wherein the controllable resistance circuit is configured for providing a resistive current path (RCP) parallel to the clamping current path (CCP) of the voltage clamping circuit when the voltage clamping circuit is activated such that it conducts an electrical current (Icl), and for providing a high-impedance parallel to the clamping current path (CCP) of the voltage clamping circuit when voltage clamping circuit is deactivated;
   wherein the current through the voltage clamping circuit is detected and triggers the controllable resistance circuit to provide the resistive current path (RCP) parallel to the clamping current path (CCP);
   wherein the controllable resistance circuit is configured for changing an effective resistance of the resistive current path (RCP) over time after triggering of the controllable resistance circuit;
   wherein the controllable resistance circuit is configured for selectively activating at least one parallel resistive path by means of at least one respective switching element for setting the effective resistance of the resistive current path (RCP) by connecting at least a subset of the at least one resistive path in parallel with the clamping current path (CCP)
   wherein the selective activation of at least one parallel resistive path is controlled by a state-machine comprising a digital control circuit for digitally controlling the controllable resistance circuit;
   wherein the voltage clamping circuit comprises at least two clamping elements connected in series between said terminals (V+, V−), wherein an intermediate node (N1) between said clamping elements is used for generating a further supply voltage (VDD), which is lower than the supply voltage (VL) on said terminals (V+, V−) and which is used for supplying other circuitry in said overvoltage protection circuit.

2. The overvoltage protection circuit according to claim 1, wherein the state-machine is self-timed.

3. The overvoltage protection circuit according to claim 1 wherein:
   said over voltage protection circuit is connected to an AC overvoltage protection circuit comprising a voltage rectifier having input terminals (VAC) for carrying an AC voltage and output terminals (V+, V−) for supplying a rectified voltage, and
   wherein the overvoltage protection circuit is coupled to the output terminals (V+, V−) of the voltage rectifier circuit.

4. The overvoltage protection circuit according to claim 1 wherein:
   said overvoltage protection circuit is connected to an electrical power supply system;
   wherein said electric power supply system comprises a voltage source, an electric cable having a resistive impedance, a load coupled to the voltage source via the electric cable, and
   wherein the overvoltage protection circuit is connected in parallel with the load.

5. The overvoltage protection circuit according to claim 4, wherein the electric cable forms part of a wireline cable and the load forms part of a downhole tool connected to the wireline cable.

6. The overvoltage protection circuit according to claim 1 wherein:
   said overvoltage protection circuit comprises a part of a downhole tool.

7. The overvoltage protection circuit according to claim 1 wherein:
   said over voltage protection circuit comprises a part of a tethered subsea vehicle.

8. The overvoltage protection circuit according to claim 3 wherein:
   said voltage rectifier is a diode bridge.

* * * * *